(12) United States Patent
McEwen

(10) Patent No.: US 9,806,508 B2
(45) Date of Patent: Oct. 31, 2017

(54) ELECTRICAL DEVICE BOX FOR MOUNTING IN A CLEAN ROOM

(71) Applicant: Boyd L. McEwen, Barron, WI (US)

(72) Inventor: Boyd L. McEwen, Barron, WI (US)

( * ) Notice: Subject to any disclaimer, the term of this patent is extended or adjusted under 35 U.S.C. 154(b) by 0 days.

(21) Appl. No.: 14/924,656

(22) Filed: Oct. 27, 2015

(65) Prior Publication Data

US 2016/0126710 A1  May 5, 2016

Related U.S. Application Data

(60) Provisional application No. 62/072,826, filed on Oct. 30, 2014.

(51) Int. Cl.
*H02G 3/08* (2006.01)
*H02G 3/14* (2006.01)

(52) U.S. Cl.
CPC ............. *H02G 3/088* (2013.01); *H02G 3/086* (2013.01); *H02G 3/14* (2013.01)

(58) Field of Classification Search
CPC .......... H02G 3/088; H02G 3/14; H02G 3/083; H02G 3/086; H02G 3/10; H02G 3/081
USPC .. 174/50, 535, 520, 53, 564, 54, 55, 58, 61, 174/480, 481, 482, 495, 499; 220/3.2–3.9, 3.92, 3.94, 4.01, 4.02, 4.26, 220/533, 532
See application file for complete search history.

(56) References Cited

U.S. PATENT DOCUMENTS

| | | | |
|---|---|---|---|
| 1,971,908 A * | 8/1934 | Fullman | H02G 3/085 |
| | | | 220/3.94 |
| 4,265,365 A * | 5/1981 | Boteler | H02G 3/088 |
| | | | 174/53 |
| 5,693,909 A | 12/1997 | McEwen | |
| 8,497,424 B2 * | 7/2013 | Castaldo | H02G 3/081 |
| | | | 174/50 |
| 2014/0083734 A1 * | 3/2014 | Magno, Jr. | H05K 5/0221 |
| | | | 174/50 |

OTHER PUBLICATIONS

Leviton, brochure for WETGUARD Watertight Wiring Devices, copyright 2013 indicated, 28 pages.

* cited by examiner

*Primary Examiner* — Dimary Lopez Cruz
(74) *Attorney, Agent, or Firm* — Skaar Ulbrich Macari, P.A.

(57) ABSTRACT

A double-single stainless steel electrical junction box is configured to receive two single covers. A center bridge spans between the top and bottom surfaces to define a first and a second cover plate-mounting aperture adjacent each lateral side of the bridge. The interior compartment of the junction box is common to both of the first and second cover plate-mounting apertures. Electrical conduit hubs can be disposed above the top surface and below the bottom surface of the junction box to allow electrical wiring to reach the interior compartment.

20 Claims, 3 Drawing Sheets

ELECTRICAL DEVICE BOX FOR MOUNTING IN A CLEAN ROOM

PRIORITY

This application claims the benefit of U.S. Provisional Application Ser. No. 62/072,826, filed on Oct. 30, 2014, which is hereby incorporated herein by reference in its entirety.

FIELD

The present invention relates generally to electrical junction boxes and, more particularly, to a stainless steel double-single junction box for clean rooms.

BACKGROUND

Clean rooms are used in many industries, such as food processing plants, electrical manufacturing and chemical manufacturing, where the processing is sensitive to contamination. Frequent wash-downs of clean rooms can include use of harsh soaps and disinfectant chemicals that are sprayed and scrubbed on the room surfaces.

Cracks, crevasses, cavities and other openings in a clean room are undesirable because they can collect and shelter contaminants and foster bacterial growth so as to compromise the cleanliness of the environment. One source of such a home for retaining contaminants and bacterial breading is electrical device boxes of the type that carry switches, outlets and the like. These boxes are typically of a multi-piece construction with various cracks and openings. They have seams that can collect foreign matter and are hard to clean.

Another issue is that the electrical boxes are subject to the hostile environment of the clean room, including being exposed to harsh and abrasive cleaning chemicals. Conventional water-tight boxes constructed of cast aluminum, plastic or malleable cast iron are undesirable because cast aluminum is prone to a high degree of corrosion from wash-down chemicals, plastic boxes are structurally inferior, and cast iron boxes are also subject to corrosion and can have a roughened surface that promotes bacterial growth.

It is disclosed in U.S. Pat. No. 5,693,909 to use stainless steel for an electrical box to withstand the rigors of the wash-down with the harsh chemicals. The disclosed box has no seams to collect dirt and foster growth of bacteria. The entirety of U.S. Pat. No. 5,693,909 is hereby incorporated by reference and made part of this application.

The box of U.S. Pat. No. 5,693,909 can be made as a single junction box or as a double junction box. In use, the opening of the box into the room must be covered with a cover plate. Thus, there must be provided both single and double face plates corresponding to the single junction box or as a double junction box that is employed. A single face plate cannot be attached to the double junction box disclosed in U.S. Pat. No. 5,693,909. Therefore, there is a need to provide for an improved electrical junction box for clean room environments.

SUMMARY

The present invention provides a unique double-single stainless steel electrical junction box that is configured to receive either two single covers or a single double cover. This added flexibility eliminates the need to stock separate covers for single and double box configurations, while still maintaining the integrity of the junction box required for clean room applications.

The disclosure includes a double-single stainless steel electrical junction box that is configured to receive two single covers. A center bridge spans between the top and bottom surfaces to define a first and a second cover plate-mounting aperture adjacent each lateral side of the bridge. The interior compartment of the junction box is common to both of the first and second cover plate-mounting apertures. Electrical conduit hubs can be disposed above the top surface and below the bottom surface of the junction box to allow electrical wiring to reach the interior compartment.

The disclosure also includes a stainless steel double-single electrical junction box. The junction box includes a rectangular box defined by opposing side walls oriented parallel to each other. A top wall and a bottom wall oppose the top wall, are oriented parallel to the top wall and span between the opposing side walls. A rear wall is oriented perpendicular to the top, bottom and side walls. The rear wall spans between the opposing side walls and between the top wall and the bottom wall. The rear wall, the top wall, the bottom wall and the opposing side walls together define an interior compartment with an open front side opposite the rear wall. A vertically-oriented center bridge spans between the top wall and the bottom wall. The center bridge is disposed adjacent the front surface. The bridge defines a first cover plate mounting aperture horizontally between a first of the opposing side walls and the center bridge and defines a second cover plate mounting aperture horizontally between the center bridge and a second of the opposing side walls. The interior compartment is open and common to both of the first and second cover plate mounting apertures. Each of the first and second cover plate mounting apertures has identical dimensions.

The disclosure further includes a system for mounting multiple single cover plates to a stainless steel electrical junction box. The system includes a rectangular stainless steel junction box. The junction box is defined by opposing side walls oriented parallel to each other. A top wall and a bottom wall oppose the top wall, are oriented parallel to the top wall and span between the opposing side walls. A rear wall is oriented perpendicular to the top, bottom and side walls. The rear wall spans between the opposing side walls and between the top wall and the bottom wall. The rear wall, the top wall, the bottom wall and the opposing side walls together define an interior compartment with an open front side opposite the rear wall. A vertically-oriented center bridge spans between the top wall and the bottom wall. The center bridge is disposed adjacent the front surface. The bridge defines a first cover plate mounting aperture horizontally between a first of the opposing side walls and the center bridge and defines a second cover plate mounting aperture horizontally between the center bridge and a second of the opposing side walls. The interior compartment is open and common to both of the first and second cover plate mounting apertures. The center bridge comprises a channel that is recessed rearward from the front side.

Electrical conduit hubs can be provided to one or more of the walls of the stainless steel junction box.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

Figure 1:
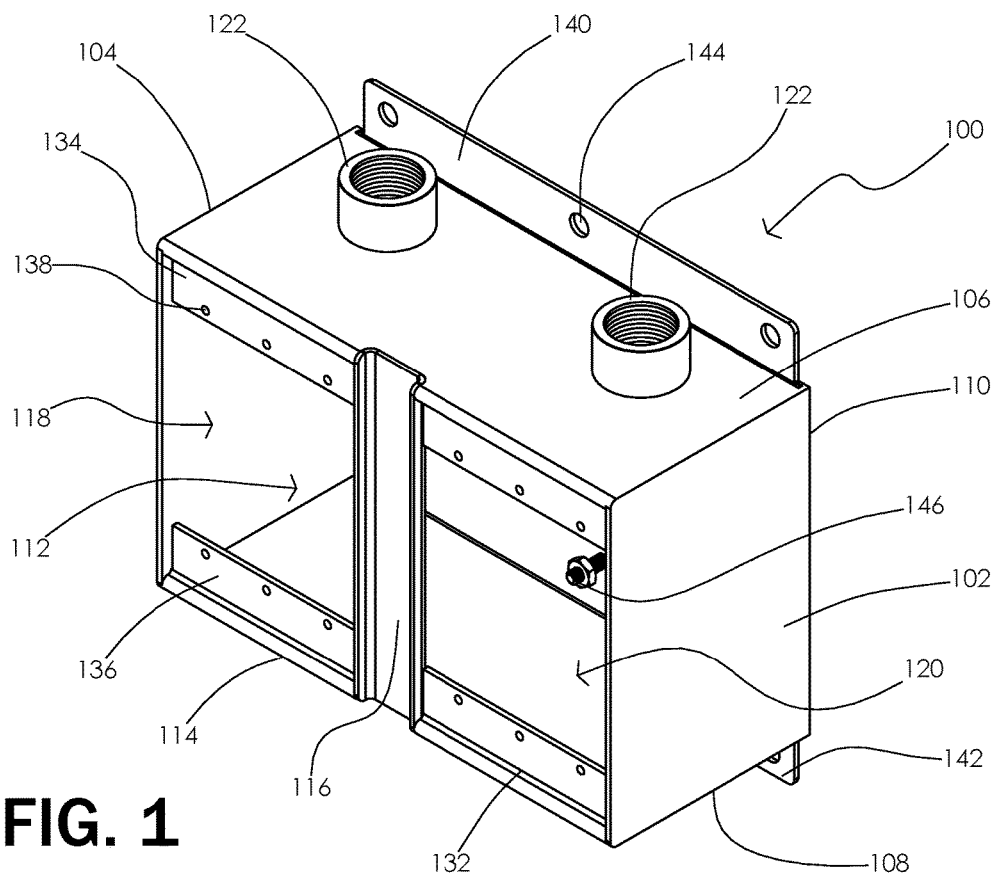
FIG. 1 is a perspective view of a double-single stainless steel electrical junction box according to certain example embodiments.
Figure 2:
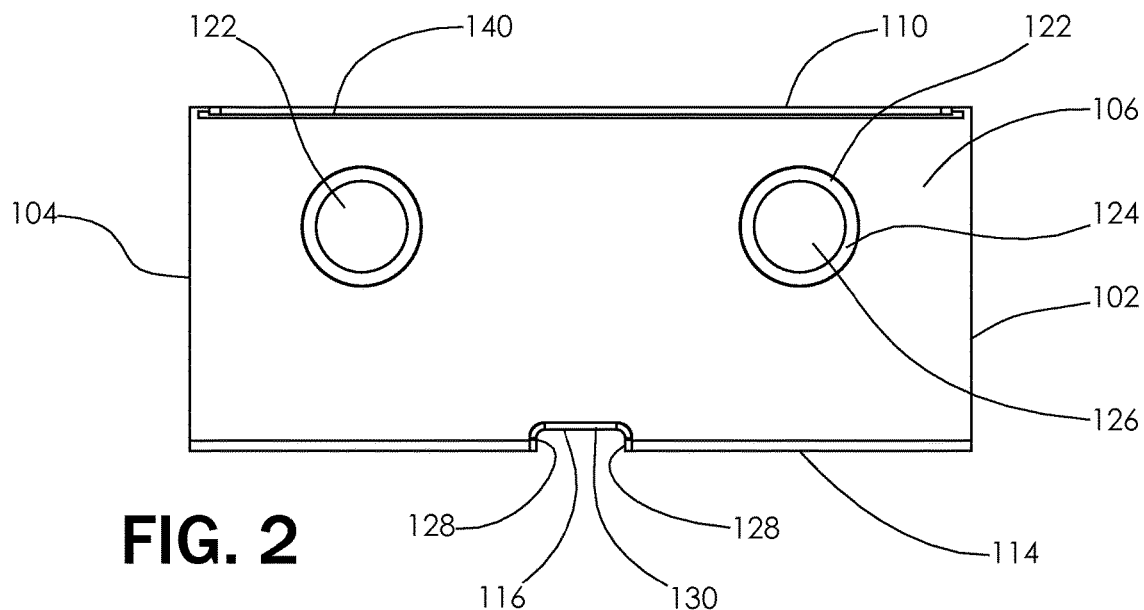
FIG. 2 is a top view of a double-single stainless steel electrical junction box according to certain example embodiments.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

Referring to FIGS. 1-4, the double-single electrical junction box 100 generally comprises a rectangular box having opposing side walls 102 and 104 oriented parallel to one another, opposing top 106 and bottom 108 walls oriented parallel to one another and spanning between the side walls 102 and 104, and a rear wall 110 oriented perpendicular to the top 106, bottom 108 and side walls 102 and 104 which spans between the side walls and top and bottom walls. Together, the rear, top, bottom and side walls define a compartment 112 with an open front side 114.

A vertically-oriented center bridge 116 spans between the top 106 and bottom 108 walls. The bridge defines a first 118 and a second 120 plate-mounting aperture adjacent each respective end wall 102 and 104 and respective side of the bridge 116. The interior 112 of the box 100 is open and common to both apertures 118 and 120. Thus, a single electrical input conduit can be used to provide for two separate electrical fixtures corresponding to each of two separate face plates.

The top wall 106 can further include one or more conduit hubs 122. The hubs 122 are hollow tubular projections extending upwards from the top wall, which are defined by a circumferential wall 124 and hollow interior 126. The hollow interior 126 is open though the top wall to the interior 112 of the junction box. The conduit hubs 122 permit electrical conduits to couple to the junction box 100, through which the electrical lines are run. Thus, the electrical lines are protected inside of conduits leading all the way into the junction box 100. The hubs can be welded in the desired location to accommodate any given installation requirements. The seamless welding of the hubs in place results in a more water tight and sanitary connection for the conduit pipe in wash-down and clean room applications.

A single hub 122 can be provided, or multiple hubs 122 can be provided, with one hub provided for each plate mounting aperture 118 and 120. The hubs 122 can alternatively be provided to any of the other walls without departing from the scope of the invention.

Figure 3:
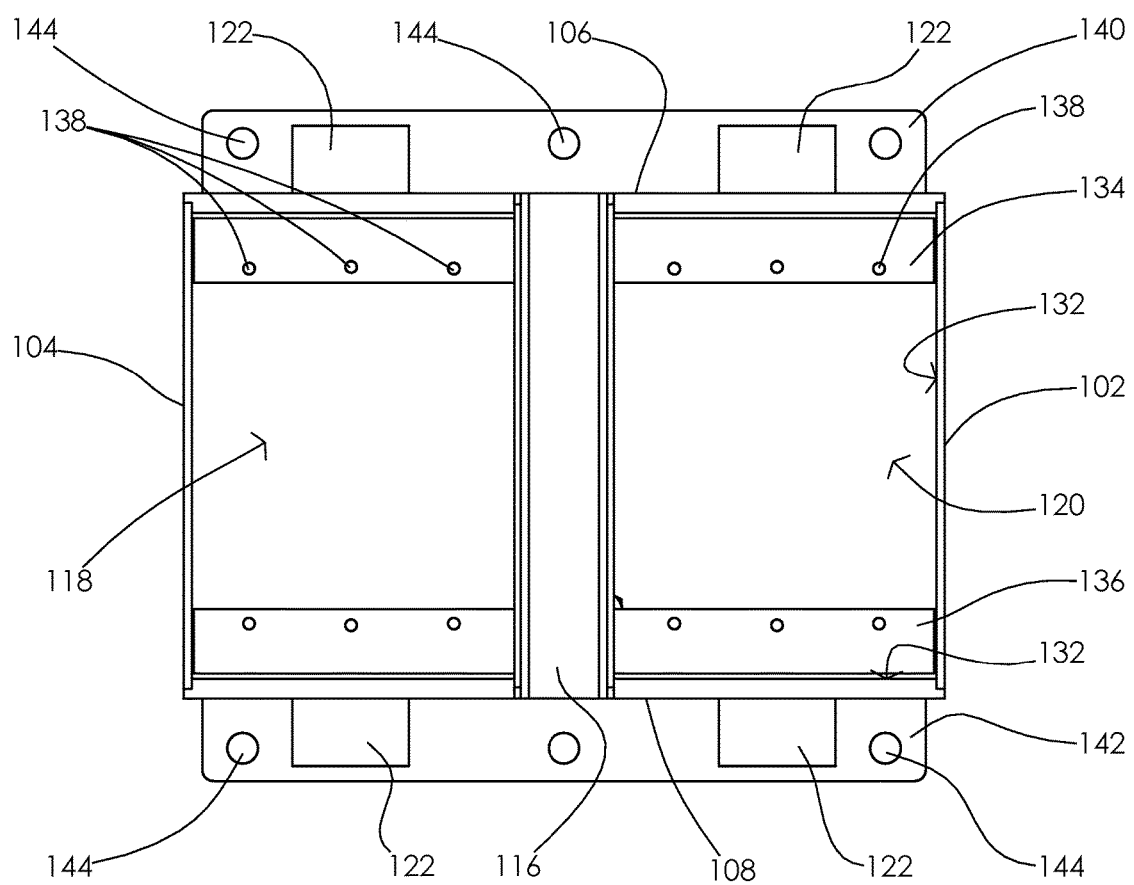
FIG. 3 is a front view of a double-single stainless steel electrical junction box according to certain example embodiments.
Figure 4:
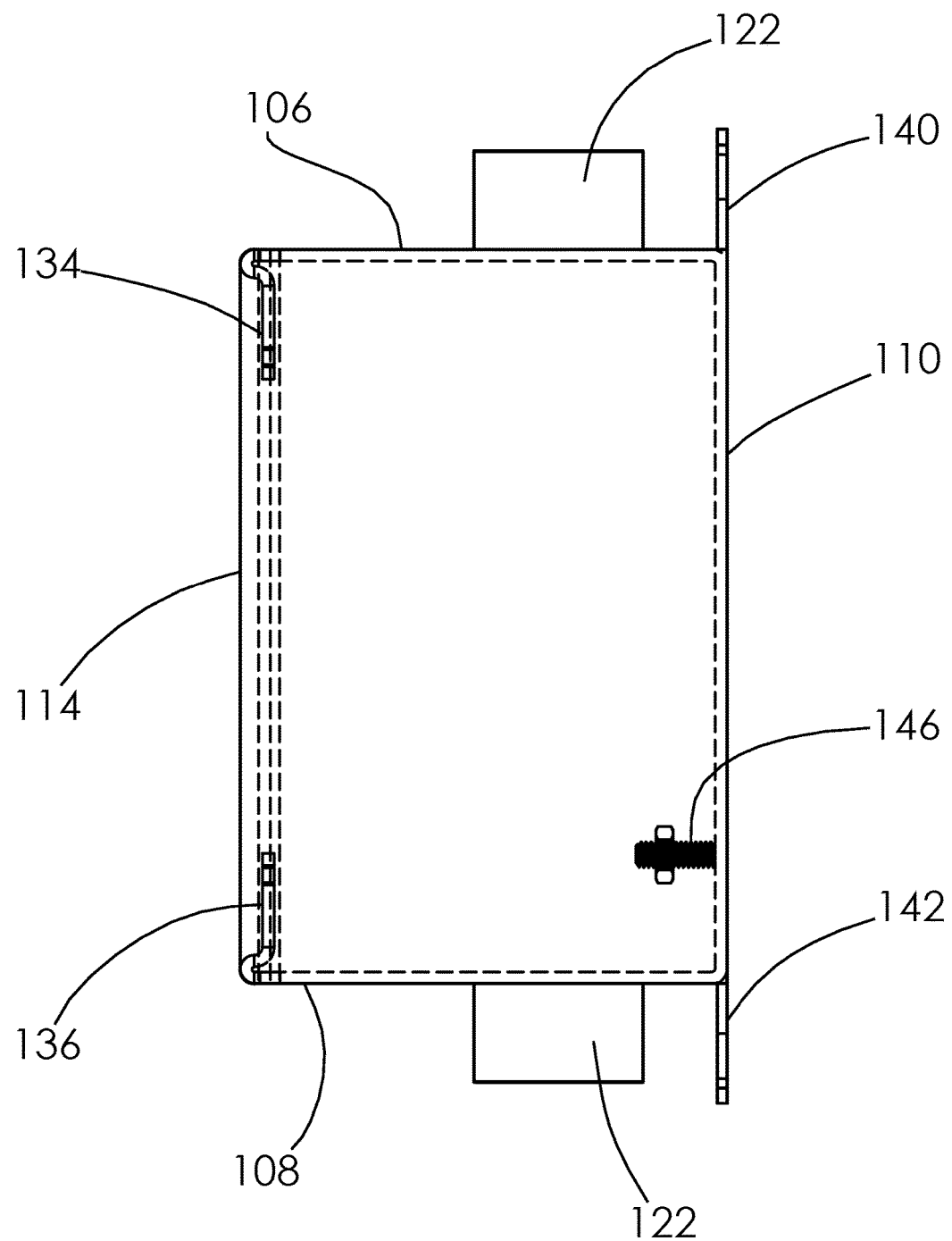
FIG. 4 is a side cross-sectional view of a double-single stainless steel electrical junction box according to certain example embodiments.

As shown in FIGS. 3-4, hubs 122 can be provided to both of the upper wall 106 and the lower wall 108. Preferably, the hubs 122 are vertically aligned from top to bottom. This configuration allows the electrical conduit to enter from one of the top or bottom sides of the box, and exit from the opposing side.

The bridge 116 defines a generally U-shaped channel that is recessed rearward from the front side of the junction box. The channel is defined by opposing sidewalls 128 and a transverse surface 130 spanning between the opposing sidewalls 128. The bridge can also be recessed in alternative shapes, such as a V-groove, a curved channel or a polygonal channel cross-section.

Each plate-mounting aperture 118 and 120 is recessed inwards slightly from the front surface 114 towards the rear wall 110, thereby forming a ridge or groove 132 around the front perimeter of each aperture 118 and 120.

Opposing upper 134 and lower 136 inner mounting flanges extend downwardly from the top wall 106 and upwardly from the bottom wall 108, respectively, to provide vertical mounting surfaces to support and secure a cover plate. A plurality of horizontally-spaced fastener apertures 138 can be defined along each of the mounting flanges 134 and 136 to allow a fastener, such as a screw, to secure the cover plate over the plate-mounting apertures 118 and 120, thereby sealing the junction box 100 against contaminant intrusion into the interior 112 thereof.

A gasket can be provided to the ridge or groove 132 around the front perimeter of each aperture 118 and 120 to enhance the sealing of the cover plate over the plate mounting aperture.

An extension of the rear wall 110 of the box 100 above the top wall 106 defines an upper mounting flange 140 for the box. Similarly, an extension of the rear wall 110 below the bottom wall 108 of the box 100 defines a lower mounting flange 142 for the box. Each mounting flange 140 and 142 includes a plurality of horizontally-spaced mounting apertures 144 defined through the width of the flanges 140 and 142. These mounting apertures 144 allow the box 100 to be secured to a wall, frame, or other support structure.

As can be seen in FIGS. 1 and 4, an electrical ground stud 146 is coupled to the rear wall 110 and extends towards the front side into the enclosed interior space 112 of the box 100.

The entire junction box 100 is preferably constructed of stainless steel. The finished product is a unitary box without seams or sharp corners. The junction box 100 is easily cleaned, strong, durable, and attractive.

A triple-single electrical junction box can also be formed using the same techniques and features described herein. In such configuration, two bridges are provided, which divides the box into a first aperture between the first end and the first bridge, a second aperture between the first and second bridges, and a third aperture between the second aperture and the second end. Again, the box includes an open interior common to all three apertures. Similarly, a junction box forming any plural number of single plates can be provided without departing from the scope of the invention.

The invention can include a device, system, method, kit, process and apparatus.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

What is claimed is:

1. A stainless steel double-single electrical junction box, comprising:
   a rectangular box defined by:
      opposing side walls oriented parallel to each other:
      a top wall and a bottom wall opposing the top wall, oriented parallel to the top wall and spanning between the opposing side walls; and
      a rear wall oriented perpendicular to the top, bottom and side walls, the rear wall spanning between the opposing side walls and between the top wall and the bottom wall,
      wherein the rear wall, the top wall, the bottom wall and the opposing side walls together define an interior compartment with an open front side opposite the rear wall;
   a vertically-oriented center bridge spanning between the top wall and the bottom wall, the center bridge disposed adjacent the front side, and defining:
      a first cover plate mounting aperture horizontally between a first of the opposing side walls and the center bridge; and
      a second cover plate mounting aperture horizontally between the center bridge and a second of the opposing side walls,
      wherein the interior compartment is open and common to both of the first and second cover plate mounting apertures,
      wherein the center bridge does not create a partition in the interior compartment, and
      wherein each of the first and second cover plate mounting apertures has identical dimensions.

2. The stainless steel double-single electrical junction box of claim 1, wherein the center bridge comprises a channel that is recessed rearward from the front side.

3. The stainless steel double-single electrical junction box of claim 2, wherein the channel of the center bridge comprises horizontally opposed sidewalls extending in a vertical direction and a transverse rearward surface spanning between the horizontally opposed sidewalls.

4. The stainless steel double-single electrical junction box of claim 1, further comprising a conduit hub extending upwards from the top wall, wherein the conduit hub defines a hollow center that is in communication with the interior compartment.

5. The stainless steel double-single electrical junction box of claim 4, wherein the conduit hub comprises a circumferential wall.

6. The stainless steel double-single electrical junction box of claim 4, further comprising a second conduit hub extending downwards from the bottom wall.

7. The stainless steel double-single electrical junction box of claim 6, wherein the conduit hub extending upward from the top wall is vertically aligned with the second conduit hub that extends downward from the bottom wall.

8. The stainless steel double-single electrical junction box of claim 4, wherein each of the first and second cover plate mounting apertures includes a respective conduit hub located laterally there above.

9. The stainless steel double-single electrical junction box of claim 1, further comprising a groove defined around each of the first and second mounting plate apertures adjacent the front side that recesses the first and second mounting plate apertures rearward from the front side.

10. The stainless steel double-single electrical junction box of claim 1, further comprising:
    an upper inner mounting flange extending vertically downwardly from the top wall into each of the first and second mounting plate apertures; and
    a lower inner mounting flange extending vertically upwardly from the bottom wall into each of the first and second mounting plate apertures,
    wherein each of the upper and lower inner mounting flanges is disposed adjacent the front side.

11. The stainless steel double-single electrical junction box of claim 10, wherein each of the upper and lower inner mounting flanges includes a plurality of horizontally-spaced fastener apertures defined therein.

12. The stainless steel double-single electrical junction box of claim 1, further comprising:
    an upper box mounting flange extending upwards from the top wall at the rear wall; and
    a lower box mounting flange extending downwards from the bottom wall at the rear wall,
    wherein each of the upper and lower box mounting flanges is coplanar with the rear wall.

13. The stainless steel double-single electrical junction box of claim 12, wherein each of the upper and lower box mounting flanges includes a plurality of horizontally-spaced mounting apertures.

14. The stainless steel double-single electrical junction box of claim 1, wherein the junction box comprises a unitary component without a seam or a sharp corner.

15. The stainless steel double-single electrical junction box of claim 1, further comprising a ground stud disposed on the rear wall and extending horizontally forwardly into the interior compartment.

16. A system for mounting multiple single cover plates to a stainless steel electrical junction box, the system comprising:
    a rectangular stainless steel box comprising:
       opposing side walls oriented parallel to each other:
       a top wall and a bottom wall opposing the top wall, oriented parallel to the top wall and spanning between the opposing side walls; and
       a rear wall oriented perpendicular to the top, bottom and side walls, the rear wall spanning between the opposing side walls and between the top wall and the bottom wall,
       wherein the rear wall, the top wall, the bottom wall and the opposing side walls together define an interior compartment with an open front side opposite the rear wall;

a vertically-oriented center bridge spanning between the top wall and the bottom wall, the center bridge disposed adjacent the front surface, and defining:
   a first cover plate mounting aperture horizontally between a first of the opposing side walls and the center bridge; and
   a second cover plate mounting aperture horizontally between the center bridge and a second of the opposing side walls,
  wherein the interior compartment is open and common to both of the first and second cover plate mounting apertures,
  wherein the center bridge does not create a partition in the interior compartment, and
  wherein the center bridge comprises a channel that is recessed rearward from the front side.

17. The system of claim 16, wherein the channel of the center bridge is generally U-shaped.

18. The system of claim 16, further comprising a first conduit hub extending upwards from the top wall, wherein the first conduit hub defines a hollow center that is in communication with the interior compartment.

19. The system of claim 18, further comprising a second conduit hub extending downwards from the bottom wall, wherein the second conduit hub defines a hollow center that is in communication with the interior compartment.

20. The system of claim 19, wherein the first conduit hub is vertically aligned with the second conduit hub.

\* \* \* \* \*